United States Patent
Dupont et al.

(10) Patent No.: US 8,704,180 B2
(45) Date of Patent: *Apr. 22, 2014

(54) DEVICE AND METHOD FOR DETECTING INFRARED RADIATION THROUGH A RESISTIVE BOLOMETER MATRIX

(75) Inventors: Benoît Dupont, Brussels (BE); Aurélie Touvignon, La Frette (FR); Michel Vilain, Saint-Georges de Commiers (FR); Antoine Dupret, Orsay (FR)

(73) Assignee: Ulis, Veurey Voroize (FR)

( * ) Notice: Subject to any disclaimer, the term of this patent is extended or adjusted under 35 U.S.C. 154(b) by 188 days.

This patent is subject to a terminal disclaimer.

(21) Appl. No.: 13/416,244

(22) Filed: Mar. 9, 2012

(65) Prior Publication Data

US 2012/0211657 A1 Aug. 23, 2012

Related U.S. Application Data

(63) Continuation-in-part of application No. 12/956,350, filed on Nov. 30, 2010, now Pat. No. 8,158,942, which is a continuation of application No. PCT/FR2009/051366, filed on Jul. 9, 2009.

(30) Foreign Application Priority Data

Jul. 29, 2008 (FR) ..................................... 08 55227

(51) Int. Cl.
*G01J 5/24* (2006.01)
(52) U.S. Cl.
CPC .......................................... *G01J 5/24* (2013.01)
USPC ...................................................... 250/338.1
(58) Field of Classification Search
CPC .................. G01J 5/20; G01J 5/22; G01J 5/24
USPC ...................................................... 250/338.1
See application file for complete search history.

(56) References Cited

U.S. PATENT DOCUMENTS

| | | |
|---|---|---|
| 5,811,808 A | 9/1998 | Cannata et al. |
| 8,158,942 B2 * | 4/2012 | Dupont et al. ............. 250/338.1 |
| 2002/0022938 A1 | 2/2002 | Butler |
| 2003/0146383 A1 | 8/2003 | Knauth et al. |
| 2003/0160171 A1 | 8/2003 | Parrish et al. |
| 2006/0231760 A1 | 10/2006 | Lee et al. |

OTHER PUBLICATIONS

Eric Mottin et al., "*Uncooled Amorphous Silicon Technology Enhancement for 25-μm Pixel Pitch Achievement*," Proc. SPIE, vol. 4820, 200 (2003) (Abstract).
Bruno Fieque et al., "*320x240 Uncooled Microbolometer 2D Array for Radiometric and Process Control Applications*," Proc. SPIE, vol. 5251, Feb. 19, 2004, pp. 114-120 (Abstract).
Cyrille Trouilleau et al., "*Low-Cost Amorphous Silicon-Based 160x120 Uncooled Microbolometer 2D Array for High-Volume Applications*" Proc. SPIE, vol. 5251, 129 (2004) (Abstract).

* cited by examiner

*Primary Examiner* — Constantine Hannaher
(74) *Attorney, Agent, or Firm* — Burr & Brown, PLLC

(57) ABSTRACT

An infrared radiation detection device comprising: a substrate; a matrix of at least one line of elements for detecting the radiation, each comprising a resistive imaging bolometer, the matrix being formed above the substrate; a bolometer reading circuit, a temperature measuring device for measuring the temperature in at least one point of the substrate; and a compensation circuit and data processing device for correcting the signal formed from each bolometer as a function of the temperature measured in at least one point of the substrate. The compensation circuit and data processing device capable of correcting the signal formed from the imaging bolometer by using a predetermined physical model of the temperature behavior of the signal.

21 Claims, 4 Drawing Sheets

DEVICE AND METHOD FOR DETECTING INFRARED RADIATION THROUGH A RESISTIVE BOLOMETER MATRIX

FIELD OF THE INVENTION

The invention relates to the field of infrared imaging and bolometric pyrometry.

To be more specific, the invention relates to the field of the correction of a spatial non-uniformity in the response from a resistive bolometer detection array.

PRIOR ART

In the field of infrared detectors, there is a known technique of using devices arranged in an array form that are able to operate at ambient temperature, in other words they do not need to be cooled to very low temperatures, unlike the detection devices known as "quantum detectors", which need to operate at very low temperature, typically that of liquid nitrogen.

These uncooled detectors conventionally use the variation of a physical variable of an appropriate material, as a function of the temperature, in the vicinity of 300K. In the case of bolometric detectors, this physical variable is the electrical resistivity of the material.

An uncooled detector of this type generally associates:
means for absorbing the infrared radiation and converting the same into heat;
means for thermally insulating the detector, so as to allow it to warm up under the action of the infrared radiation;
thermometry means which, in the context of a bolometric detector, employ a resistive element;
and means for reading the electric variables supplied by the thermometry means.

Detectors intended for infrared imaging are produced conventionally in the form of arrays of elementary bolometric detectors, or bolometers, arranged according to one or two dimensions, the array being suspended above a substrate, generally made out of silicon, via support arms for each elementary detector.

Provision is commonly made in the substrate for means for the sequential addressing of the elementary detectors and means for the electrical excitation and pre-processing of the electrical signals generated by these elementary detectors. These sequential addressing, electrical excitation and pre-processing means are therefore formed in the substrate and constitute a read circuit.

To obtain the image of a scene by the means of this detector, the scene is projected through an appropriate optics onto the array of elementary detectors, and timed electrical stimuli are applied through the medium of the read circuit to each of the elementary detectors, or to each row of the detectors, in order to obtain an electrical signal constituting the image of the temperature reached by each of the elementary detectors. This signal is processed in a more or less sophisticated way by the read circuit, and then possibly by an electronic device external to the enclosure in order to generate the thermal image of the observed scene.

Such a detector has many advantages in terms of manufacturing cost and use but also drawbacks which restrict its performance.

To be more specific, a problem is posed of the uniformity of the signal formation by the bolometer array. Indeed, owing to a dispersion in the behaviour of the bolometers, which do not all produce the same output level when they are brought to one and the same operating temperature, and which do not all respond exactly in the same way when facing one and the same infrared radiation coming from the scene, the image of a uniform scene formed by the detector has a fixed pattern noise.

The dispersion stems from many causes. We may cite the main cause as being technological dispersion of the bolometers which translates into resistance dispersion, entailing for the detectors a variation in their output levels, even when the array is exposed to a uniform scene. Another cause of signal dispersion is thermal drift in the substrate and in its spatial temperature distribution, given that the bolometers track the temperature of the substrate on which they are supported.

Commonly, the shift in the output level of one specific bolometer relative to the average output level of the bolometers of the array when it is exposed to a uniform scene, is denoted by the term "offset". The term "Continuous Level (Niveau Continu)", or NC for the sake of simplicity, is used hereinafter to denote all the output levels in these particular uniform exposure conditions.

To compensate for bolometer offset dispersion, which is the main cause of limitation in the quality of the signals supplied by the detector, many correction techniques have been set up.

One first type of offset correction, as described for example in document US 2002/022938, comprises acquiring a reference image, namely that of a uniform scene. This reference image is then stored in the system (a term used here to mean all the electromechanical and software functions implementing the detector or sensor), and then subtracted, digitally or analogically, from each image acquired thereby. The reference image is commonly formed by means of an essentially isothermic shutter, which is closed in order to obtain the uniform scene.

This first technique has the drawback of rendering the detector inoperative throughout the entire reference image acquisition time. Furthermore, installing a shutter involves additional cost and increases the sources of mechanical failure in the system and the energy consumption thereof.

The second type of offset dispersion correction is based on the fact that the offset of a resistive bolometer depends on the temperature thereof. In this second type of bolometer correction, as described for example in the document U.S. Pat. No. 5,811,808, offset tables in respect of different predetermined temperatures of the sensor are stored permanently in the system. The system is provided with a thermometric sensor that measures the temperature of the substrate, and a data processing unit then selects one of the stored offset tables as a function of the measured temperature, or creates a new offset table by interpolating stored tables as a function of the measured temperature. The offset table selected or created is then subtracted from the current image detected.

This type of correction does not require a shutter but however proves to be less effective than the first correction type. Furthermore, the higher the number of reference points and the degree of the interpolating polynomial the greater the accuracy of the correction by interpolation. In fact, quality interpolation requires significant calculation resources, and storage of a sufficient number of tables. Moreover, the offset table acquisition time is significant. Lastly and above all, by virtue of its principle, an interpolation is only accurately valid in the vicinity of the reference points. The manufacturing cost of a detector implementing the second technique thus becomes prohibitive as soon as accurate sampling is required throughout the full operating temperature range of the detector.

The purpose of the invention is to resolve the aforementioned problems, by proposing an effective and accurate correction technique, which does not require a shutter, while using a limited number of tables.

DISCLOSURE OF THE INVENTION

To this end, the object of the invention is an infrared radiation detection device that comprises a substrate, an array of at least one line of elements for detecting the radiation, each comprising a resistive imaging bolometer, the array being formed above the substrate, the device comprising means for measuring the temperature in at least one point of the substrate (known as the focal plane temperature, or FPT), and means for correcting the signal formed from each bolometer as a function of the temperature measured in at least one point of the substrate.

According to the invention, the correcting means are capable of correcting the signal formed from the bolometer, by means of a predetermined physical model of the temperature behaviour of the signal, and particularly by means of a predetermined physical model of the temperature behavior of the bolometer.

To advantage, the model is formulated in a compact way, in other words suitable for fast calculation without numerical resolution of differential equations.

The temperature of the resistive bolometer, and consequently the electrical resistance thereof, depend on the temperature of the scene observed whereof the infrared power is projected onto the bolometer array via the optics and is absorbed by each bolometer, but above all on the focal plane temperature. Since bolometers are thermal detection elements, they are suspended above the substrate containing the read circuit by thermal insulation arms. Through thermal conduction, the focal plane temperature has a direct effect upon the temperature of the bolometer. It may be assumed as a general idea that the contribution of the focal plane to the temperature of the bolometer is about 99% as against about 1% for the scene temperature. The bolometer output level behaviour, whatever the scene temperature, therefore mainly depends on the focal plane temperature. The focal plane temperature therefore sets the temperature operating point of the bolometers. The resistance dispersions of the bolometers also vary as a function of the focal plane temperature. The change in resistance of a specific bolometer may be estimated as a function of the focal plane temperature, and consequently also the change in the dispersion (since each can be known). Accurately modelling the temperature behavior of the signal formed from the bolometer, and in particular modelling the temperature behaviour of the bolometer, therefore ensures correction validity over time when changes occur in the focal plane temperature.

Bolometer signal "behavior" is the term used here to define the repeatable correspondence between the focal plane temperature, which constitutes the thermal quiescent operating point of the bolometer, and the signal formation process outcome, which depends on the various physical parameters of the elements involved in developing the signal. The most important of these parameters is the electrical resistance of the bolometer formed on this substrate, for given conditions of IR irradiance, at any focal plane temperature but other parameters may also play a part, such as for example the electrical resistance of a compensation structure.

Indeed, a so-called compensation structure is very widely used during signal formation, with the aim of producing a so-called common mode current that represents the imaging bolometer current part independent of the scene. This current is subtracted from the imaging bolometer current prior to signal formation, as will be explained in more detail subsequently. Typically, this structure is itself bolometric, and formed with the same material as the sensitive imaging structure. In this way, the current used to form the signal is already largely compensated by the variations induced by the fluctuations in the focal plane temperature, and essentially represents the thermal scene. The previous considerations with regard to the effect of the focal plane temperature on the signal and its dispersions remain very widely applicable.

This correspondence between the focal plane temperature and the formed signal is preferably established by means of a "physical model" that expresses the behavior law of the signal formed as a function of the focal plane temperature in these reference optical conditions.

It will be noted that a physical model here denotes one or more mathematical relationships, such as a function or a system of differential equations for example, whereof the outputs are calculable whatever the value of its inputs from a single set of identified behavioral parameters. Preferentially, the aim of the invention is signal modelling in a "compact" analytical form which allows direct and fast calculation free from sophisticated resolution loops.

In other words, a physical model of the temperature behavior of the signal formed from a bolometer allows the signal offset to be determined as a function of the measured focal plane temperature, with no need to use a shutter or an interpolation of a plurality of tables.

Moreover, physical models use a limited number of parameters so that parameter identification is less costly than identifying the plurality of tables of the prior art.

According to the invention, the temperature measurement means comprise at least one probe for measuring the temperature of the substrate.

According to one particular embodiment of the invention, the temperature measurement means include a plurality of temperature measurement probes capable of measuring the temperature of the substrate in a plurality of points thereof and means for modelling the spatial distribution of the temperature of the substrate as a function of the measured temperature in the plurality of points of the substrate, and in that the correcting means are capable of correcting the signal formed from the bolometer as a function of the modelled temperature of the substrate in the vicinity thereof.

In other words, the substrate may be spatially non-uniform in terms of its temperature. By modelling the spatial distribution of the substrate temperature, it is possible to determine the temperature thereof underneath each bolometer and therefore to increase correction accuracy.

To advantage, the correcting means are capable of estimating the continuous level (NC) corresponding to the exposure of the array to a uniform scene of temperature substantially equal to the measured focal plane temperature.

The correcting means are capable on the one hand of estimating the resistance of the bolometer according to the relation:

$$R_{est}(i,j) = R_{abs}(i,j) \cdot C(T_{mes})$$

where:

$R_{est}(i, j)$ is the estimated resistance of the bolometer, $R_{abs}(i, j)$ is a predetermined reference resistance of the bolometer, $C(T_{mes})$ is a parameter dependent on the measured focal plane temperature $T_{mes}$ expressed in degrees Kelvin.

Preferably, the parameter $C(T_{mes})$ is calculated according to the relation:

$$C(T_{mes}) = \exp\left(\frac{E_A}{k \cdot T_{mes}}\right)$$

where:
$E_A$ is a predetermined bolometer conductivity activation energy,
k is the Bolzmann constant.

According to one particular embodiment of the invention, the device comprises a common mode compensation structure that includes a compensating bolometer associated with each column of the array, the read means being capable of forming the signal from a difference between a current flowing in the imaging bolometer and a current flowing in the compensating bolometer associated therewith, and the correcting means are capable of estimating a resistance of the compensating bolometer, corresponding to the exposure of the matrix to a uniform scene of temperature substantially equal to the measured temperature, in order to correct the signal.

In particular, the correcting means are capable of estimating the resistance of the compensating bolometer according to the relation:

$$R_{comp\text{-}est}(j) = R_{comp\text{-}abs}(j) \cdot C(T_{mes})$$

where $R_{comp\text{-}est}(j)$ is the estimated resistance of the compensating bolometer, $R_{comp\text{-}abs}(j)$ is a predetermined reference resistance of the compensating bolometer, and $C(T_{mes})$ is a parameter dependent on the measured temperature $T_{mes}$ of the substrate. To be more specific, the parameter $C(T_{mes})$ is calculated according to the relation:

$$C(T_{mes}) = \exp\left(\frac{E_A}{k \cdot T_{mes}}\right)$$

where $E_A$ is a predetermined imaging bolometer activation energy, k is the Bolzmann constant, and $T_{mes}$ is the measured temperature expressed in degrees Kelvin.

According to one particular embodiment of the invention, the correcting means are capable of:
estimating a continuous level of the signal formed from the imaging bolometer, corresponding to the exposure of the array to a uniform scene of temperature substantially equal to the measured temperature, according to the relation:

$$NC(i,j) = \alpha - \beta \times (I_{comp}(j) - I_{ac}(i,j))$$

where $\alpha$ and $\beta$ are predetermined parameters dependent on the read circuit, $I_{comp}(j)$ is the current flowing in the compensating bolometer calculated from the estimated resistance thereof, and $I_{ac}(i,j)$ is the current flowing in the imaging bolometer calculated from the estimated resistance thereof; and
correcting the signal $N_{brut}(i,j)$ formed from the imaging bolometer according to the relation:

$$N_{corr}(i,j) = N_{brut}(i,j) - NC(i,j) + \overline{NC}$$

where $N_{corr}(i,j)$ is the corrected output signal and $\overline{NC}$ is the mean value of the estimated continuous levels.

The correcting means are on the other hand capable of estimating the continuous signal level (NC) from this resistance estimation and from the configuration of the circuit responsible for establishing the signal. In particular, the correcting means are capable of estimating the resistance of the common mode compensation structures according to a formulation directly inspired from the previous relations, where typically in particular the same conductivity activation energy will be used. The modelled signal is established by expressing the difference in the currents produced by the imaging bolometer and by the compensating bolometer, as will be discussed below.

The correcting means are thus capable of correcting output levels, temperature behavior dispersions of the bolometers of the array.

To advantage, the correcting means are at least partially implemented in the substrate.

To advantage, the reference resistances of the bolometers of the array can be tabulated in a permanent memory built into the substrate.

According to one inventive alternative, the correcting means are implemented in the form of an electronic circuit built into the substrate.

A further object of the invention is a method for detecting infrared radiation by means of an array of at least one line of elements for detecting the radiation each comprising a resistive imaging bolometer, said array being formed above a substrate, the method comprising a step of reading the bolometers of the array, a step of measuring the temperature in at least one point of the substrate, and a step of correcting the signal formed from each bolometer as a function of the temperature measured in at least one point of the substrate.

According to the invention, the correction step comprises correcting the signal formed from the bolometer based on a predetermined physical model of the behaviour of the signal according to the focal plane temperature.

BRIEF DESCRIPTION OF THE FIGURES

The invention will be better understood from reading the following description, given solely by way of example and provided in relation to the appended drawings, wherein identical reference numbers are used to denote identical or similar elements, and wherein.

EMBODIMENT OF THE INVENTION

Figure 1A:
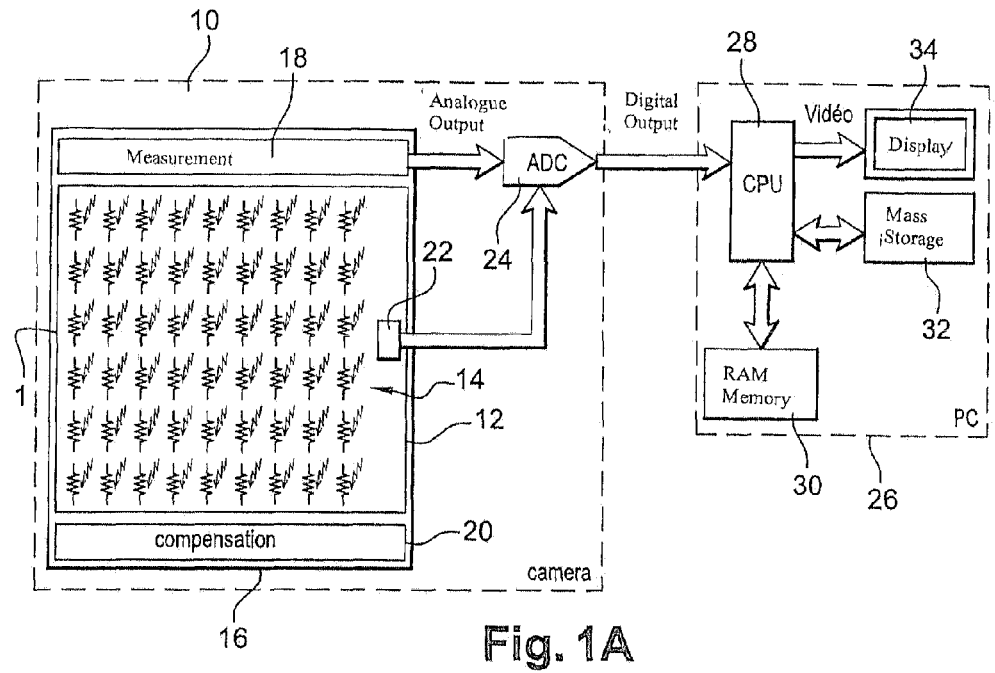
FIG. 1A is a diagrammatic view of a bolometric detection device according to first embodiment the invention.

A diagrammatic view is shown in FIG. 1A, using the general reference number 10, of a bolometric detector for acquiring a scene in thermal infrared radiation, the detector being incorporated into the focal plane of the optics of an infrared camera. Such a detector comprises:

a two-dimensional imaging array 12 that includes n lines and m columns of resistive imaging bolometers 14 with suspended membrane, where n and m are integers greater than or equal to 1. The imaging array 12 is arranged in the focal plane of the infrared transparent optics of the camera and suspended above a reflective substrate;

a read circuit 16 formed in the substrate. The read circuit 16 includes a circuit for line-by-line addressing of the imaging array 12 and, for each column thereof, a measurement circuit capable of being connected to each imaging bolometer 14 of the addressed column; these measurement circuits are collectively represented by the block 18, which further includes means for multiplexing the signals towards the analogue output or outputs;

the read circuit 16 further comprises a line 20 of compensation circuits including one or more compensating bolometers in relation to each column of the imaging array 12;

at least one temperature probe 22 formed in the substrate and measuring a temperature thereof; and a conversion circuit 24 connected to the read circuit 16 and to the temperature probe 22 in order to convert analogue signals delivered thereby into digital signals.

The bolometric detector structure is conventional and will not be explained in further detail below. For further information, reference may usefully be made to the document "*Uncooled amorphous silicon enhancement for 25 µm pixel pitch achievement*" by E. Mottin et al, Infrared Technology and Application XXVIII, SPIE, vol. 4820.

The bolometric detector 10 is further connected to a data processing unit 26 that implements an algorithm for processing the signals delivered thereby so as to determine an infrared image of the scene projected on the array 12, and a compensation of a dispersion of the behavior of the imaging bolometers 14, as will be explained in more detail below.

The data processing unit 26 is used for example in a personal computer that comprises, in a known way, a central processing unit, or CPU 28, associated with a random-access memory 30, and with a bulk store 32, such as a hard disk for example. The unit 26 is furthermore connected to a display screen 34 for viewing the infrared images captured by the camera. Clearly much better integrated material embodiments, based on appropriate inter-communicating circuits as known in the prior art in the field, can be employed in exactly the same way.

Figure 2:
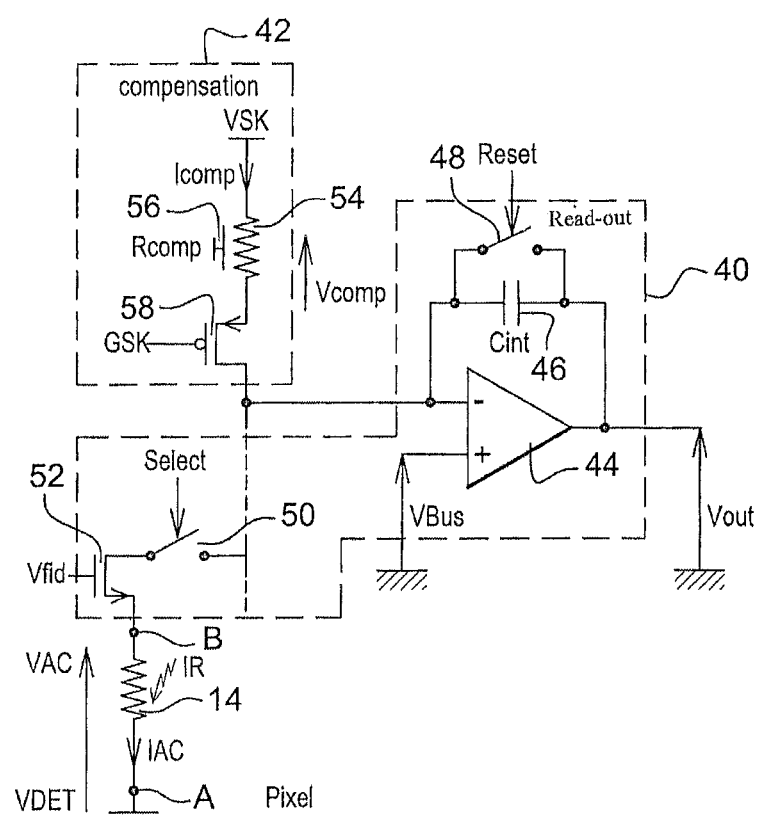
FIG. 2 is a diagrammatic view of a layout showing an imaging bolometer, a compensation circuit and a measurement circuit forming constituent parts of the device in FIG. 1.

In FIG. 2 is shown a preferred elementary layout:
of an imaging bolometer 14 of the array 12;
of a measurement circuit 40 of the read circuit 16 for measuring the imaging bolometer 14; and
of a compensation circuit 42 of the line 20 for the compensation of a common mode current flowing in the imaging bolometer 14 during the reading thereof.

The bolometer 14 is subjected to infrared radiation IR coming from a scene and is connected to a constant voltage VDET via a first terminal A.

The measurement circuit 40 includes:
an operational amplifier 44 whereof one non-inverting terminal (+) is set at a predetermined constant voltage VBUS;
a capacitor 46, of predetermined capacitance $C_{int}$, connected between an inverting terminal (−) of the amplifier 44 and an output thereof;
a reset switch 48 connected in parallel to the capacitor 46 and controllable by means of a "Reset" signal;
a read switch 50, controllable by means of a Select signal, and connected to the inverting terminal (−) of the operational amplifier; and
a first MOS injection transistor 52, whereof the gate is set at a predetermined constant voltage GFID, whereof the source is connected to a second terminal B of the bolometer 14, and whereof the drain is connected to the other terminal of the read switch 50.

The compensation circuit 42 of the common mode current passing through the imaging bolometer 14 includes a resistive compensating bolometer 54 made out of the same material as the imaging bolometer 14 with low thermal resistance towards the substrate and provided, optionally, with a shield 56 against the radiation coming from the scene.

It will be noted that the resistance of the compensating bolometer 54 varies insignificantly relative to that of the imaging bolometer 14, when it is subjected to an incident infrared flux, since the compensating bolometer 54 is insensitive to the infrared radiation from the scene. It may thus be considered that the resistance of the compensating bolometer is substantially constant at the given focal plane temperature.

The compensating bolometer 56 is connected at one of its terminals to a predetermined voltage VSK and at the other of its terminals to the source of a second MOS injection transistor 58 of the compensation circuit 42. The drain of the transistor 58 is connected to the inverting input of the operational amplifier 44 and the gate is connected to a predetermined voltage GSK.

At the start of a read cycle of the bolometer 14, the reset switch 48, which is in an on-state subsequent to a discharge cycle of the capacitor 46, is switched into an off-state by adjusting the "Reset" signal to an appropriate value. The read switch 50, which is an off-state, is switched into an on-state by adjusting the "Select" control. The electronic circuit performs an operation of integrating the difference between the current $I_{ac}=V_{ac}/R_{ac}$ passing through the bolometer 14 and the current $I_{comp}=V_{comp}/R_{comp}$ passing through the compensating bolometer 54, whereof the outcome is expressed in the form of voltage at the terminals of the capacitor 46. The voltages $V_{ac}$ and $V_{comp}$ seen at the terminals of the active and compensating bolometers respectively are the result of the various supply and control voltages of the transistors 52 and 58, so as to define an appropriate operating point for the active bolometer on the one hand, and an effective common mode compensation of the compensating bolometer on the other hand, and there is no need to go any further into the detailed relationships that can be defined by those skilled in the art from the diagram in FIG. 2. When a predetermined integration time $\Delta T_{int}$ has elapsed from the start of the read cycle, the read switch 50 is switched into its off-state.

The voltage or output level of the amplifier 44, which will be termed $N_{brut}$, which contains the signal from the imaging bolometer 14 of resistance $R_{ac}$, is expressed, assuming, for the sake of simplicity, that $R_{ac}$ varies little during the integration time $\Delta T_{int}$, according to the relation:

$$N_{brut} = VBUS - \frac{\Delta T_{int}}{C_{int}} \times \left( \frac{V_{comp}}{R_{comp}} - \frac{V_{ac}}{R_{ac}} \right) \tag{1}$$

where:
$V_{ac}$ is the voltage at the terminals of the imaging bolometer 14;
$R_{ac}$ is the resistance of the imaging bolometer 14;
$V_{comp}$ is the voltage at the terminals of the compensating bolometer 54; and
$R_{comp}$ is the resistance of the compensating bolometer 54.

The conversion circuit 24, which is connected to the amplifier 44, converts the analogue voltage $N_{brut}$ into a digital value. The circuit 24 delivers this digital value to the data processing unit 26 which determines as a function thereof a corresponding image pixel value, as is well known.

The arrangement and operation of the elements that have just been described are conventional and will not be explained in further detail in the interests of conciseness. For further detail, reference may be made to the following documents:

"*Uncooled amorphous silicon enhancement for 25 μm pixel pitch achievement*" by E. Mottin et al, Infrared Technology and Application XXVIII, SPIE, vol. 4820;

"*320×240 uncooled microbolometer 2D array for radiometric and process control applications*" by B. Fieque et al., Optical System Design Conference, SPIE, vol. 5251; et "*Low cost amorphous silicon based 160×120 uncooled microbolometer 2D array for high volume applications*" by C Trouilleau et al., Optical System Design Conference, SPIE, vol. 5251.

Figure 3:
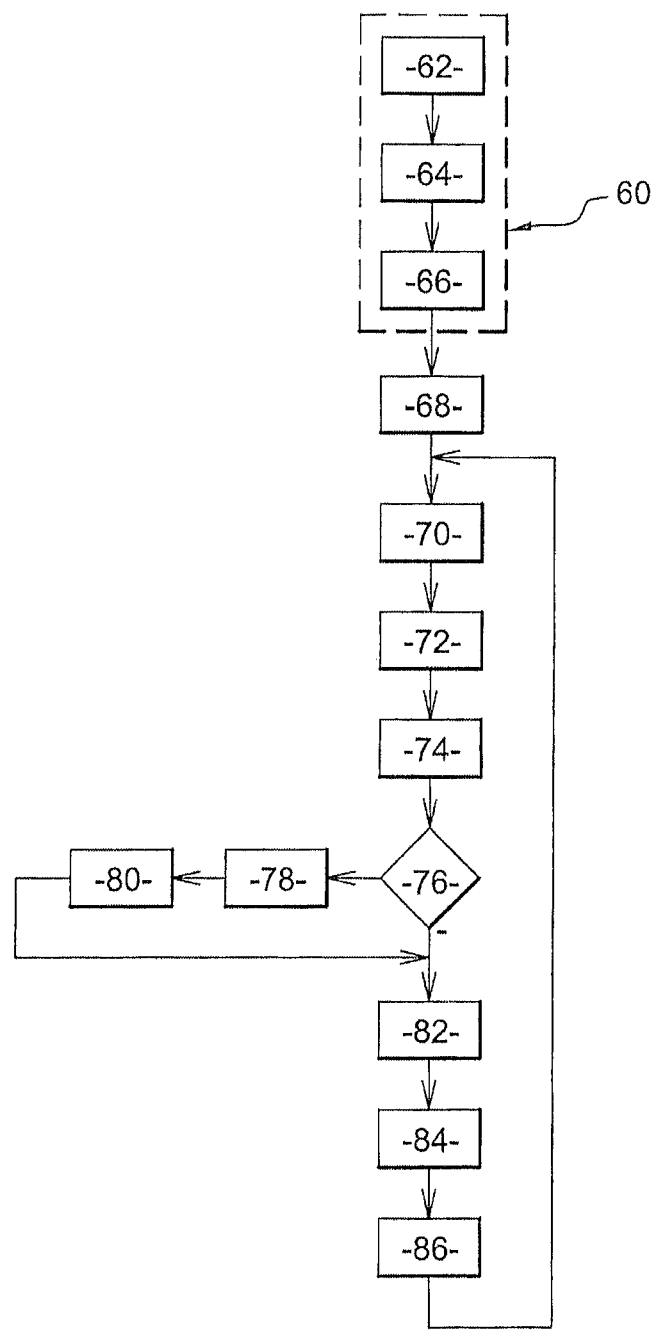
FIG. 3 is a flow chart of the operation of the system in FIG. 1 according to a first embodiment.

A description will now be given, in relation to the flow chart in FIG. 3, of a method for compensating the offsets of the imaging bolometers 14 of the array 12, implemented by means of the device that has just been described.

In a first initialization phase 60, implemented before the first use of the detector according to the invention, for example in the factory, a reference resistance is identified for each of the imaging bolometers 14 of the array 12.

This initialization phase 60 includes a step 62 during which the detector 10 is exposed to a uniform scene of constant temperature, while ensuring that the focal plane temperature of the detector, and therefore of the imaging bolometers 14 and of the substrate, is substantially equal to the scene temperature. At the same time, the temperature of the substrate is measured by the temperature probe 22 and the measurement delivered after digital conversion to the data processing unit 26, and stored under the parameter $T_{ref}$.

In a following step 64, a specific array read cycle is implemented, wherein the common mode current compensation implemented by the compensation circuits 42 is deactivated.

For a specific imaging bolometer 14, only the current passing through it is therefore integrated by the associated measurement circuit 40. At the end of the read-out of this bolometer, the output voltage $V_{out}$ of the amplifier 44 is therefore expressed according to the relation:

$$V_{out} = VBUS + \frac{\Delta T_{int}}{C_{int}} \times \frac{V_{ac}}{R_{ac}} \quad (2)$$

In the particular case of step 64, the voltage $V_{FID}$ is commonly brought to VDD. The series resistance of the transistor 52 is negligible and the following simplified expression may be supposed:

$V_{ac} \cong VBUS - VDET$

Preferably, the voltages VBUS and VDET are selected to be close to each other so as to prevent too significant a current from passing through the imaging bolometer and causing heating up that may be detrimental thereto by Joule effect.

It will be noted that in order to implement the read step 64, a shorter integration time $\Delta T_{int}$ and/or a higher capacitance $C_{int}$, which will in this case have to be provided in the read circuit, may be selected so as to prevent saturation of the capacitor 46 or of the amplifier 44.

Once the read-out of the array 12 is complete, a reference resistance $R_{abs}$ is calculated, in a following step 66, for each imaging bolometer 14 by the data processing unit 26 from a physical model of the temperature behavior of its resistance.

To be more specific, in 66, the data processing unit 26 calculates the reference resistance according to the relations:

$$R_{abs}(i, j) = R_{ac}(i, j) \cdot \exp\left(\frac{-E_A}{k \cdot T_{ref}}\right) \quad (3)$$

$$R_{ac}(i, j) = \frac{VBUS - VDET}{(V_{out}(i, j) - VBUS)} \times \frac{\Delta T_{int}}{C_{int}} \quad (4)$$

where:
exp is the exponential function,
$E_A$ is a predetermined bolometer activation energy,
k is the Bolzmann constant,
et $T_{ref}$ is the substrate temperature measured at step 60.

Once the initialization step 60 is complete, a two-dimensional table $R_{abs}$ is then obtained of reference resistances for the imaging bolometers of the array 12. This table is then stored in the bulk memory 32 of the data processing unit 26.

Once the detector has left the factory and is operated by the user, the method continues in respect of the real-time correction of the offsets of the imaging array 12.

At system power-up, the reference resistance table is loaded, at 68, into the random-access memory 30 of the data processing unit 26. Still at 68, two two-dimensional tables of dimensions corresponding to those of the imaging array 12, namely a table $R_{est}$ of estimated resistances and a table NC of output levels, are reset to zero and stored in the random-access memory 30.

In a following step 70, the array 12 is exposed to a scene to be observed. Then, or at the same time as step 70, the temperature of the substrate is measured at step 72 by means of a probe 22 and the temperature value is stored as a parameter $T_{mes}$.

The method then continues with a conventional read step 74 (with common mode compensation, or skimming) of the imaging bolometers 14 of the array 12, as has been previously described. The different measured voltages (or output levels) $N_{brut}$ associated with these bolometers are digitized and stored in the random-access memory 30.

A test is then performed at step 76 by the unit 26 to state whether the absolute value of the difference between the values $T_{ref}$ and $T_{mes}$ is greater than a predetermined threshold value, for example equal to 0.2 degrees Kelvin.

If the result of this test is positive, an estimated resistance $R_{est}(i, j)$ is calculated at 78 for each bolometer of the array 12 by the unit 26. This estimated resistance of the bolometer is calculated as a function of the corresponding reference resistance $R_{abs}(i,j)$ of the table $R_{abs}$, according to the relation:

$$R_{est}(i, j) = R_{abs}(i, j) \cdot \exp\left(\frac{E_A}{k \cdot T_{mes}}\right) \quad (5)$$

The value $R_{est}(i,j)$ then replaces the corresponding value of the table $R_{est}$.

Once step 78 is complete, an estimated resistance has therefore been calculated for each bolometer of the imaging array 12 and stored in the table $R_{est}$.

The method then continues with a step 80 for the calculation, in respect of each imaging bolometer of the table 12, of an output level when facing the uniform scene NC(i,j) by the unit 26 according to the relations:

$$NC(i, j) = VBUS - \frac{\Delta T_{int}}{C_{int}}(I_{comp} - I_{ac}(i, j)) \quad (6)$$

Those skilled in the art are able to express $I_{comp}$ when the MOS 58 is in saturation mode, from the technological parameters and the circuit configuration, according to the relation:

$$I_{comp} = \frac{-(1+2\cdot R_{comp}\cdot A_p(VSK-GSK-V_{thp}))-}{\sqrt{1+4\cdot R_{comp}\cdot A_p(VSK-GSK-V_{thp})}} \quad (7)$$
$$\overline{-2\cdot A_p \cdot R_{comp}^2}$$

On the other hand $I_{ac}$ is expressed, when the MOS 52 is in saturation mode, by the relation:

$$I_{ac}(i,j) = \frac{-(1+2\cdot R_{est}(i,j)\cdot A_n(GFID-V_{thn}))-\sqrt{1+4\cdot R_{est}(i,j)\cdot A_n(GFID-V_{thn})}}{-2\cdot A_n \cdot R_{est}^2(i,j)} \quad (8)$$

where

Ap and An are known technological factors of the MOS 58 and 52 respectively;

$V_{thp}$ and $V_{thn}$ are the known threshold values of the MOS 58 and 52 respectively; and VFID and GSK being the voltages applied to the gates of the transistors 52 and 58 respectively, also known.

The newly calculated continuous levels NC(i,j) then replace the values of the table NC corresponding to the imaging bolometers. Once the step 80 is complete, a so-called continuous, uniform scene level has therefore been calculated for each bolometer of the imaging array 12 and stored in the table NC.

The step 80 is followed by a step 82 of correction by the unit 26 of the digitized output voltage $N_{brut}(i,j)$ of each imaging bolometer according to the relation:

$$N_{corr}(i,j)=N_{brut}(i,j)-NC(i,j)+\overline{NC} \quad (9)$$

where $N_{corr}(i,j)$ is the corrected digitized output voltage and $\overline{NC}$ is the mean value of the output voltages when facing a uniform scene calculated at step 80.

If the test applied at step 76 is negative, in other words if the substrate temperature has not varied significantly between two read cycles of the imaging array 12, step 76 loops to the correction step 82. The continuous level is then corrected on the basis of a table NC of continuous levels calculated during a previous cycle.

Step 82 then continues with the display, or more generally the use, at 84, of the corrected image of the scene captured by the array 12, and then at step 86 with the adjustment of the temperature value $T_{ref}$ to the value $T_{mes}$. Step 86 then loops to the exposure step 70 in order to fulfil a new read cycle.

In the embodiment that has just been described, only the imaging bolometers 14 are taken into account as a source for the dispersion of the offsets of the output signals. Thus, as may be noted from reading the relation (6), the continuous levels NC(i,j) depend on a plurality of variables including in particular the current $I_{ac}(i,j)$ passing through the imaging bolometers 14. In so far as the main dispersion source comes from the non-uniform behaviour of the imaging bolometers, the continuous levels NC(i,j) are therefore calculated as a function of the currents $I_{ac}(i,j)$.

However, as may be noted from reading the relation (6), the continuous levels NC(i,j) also depend on other variables, and in particular the current $I_{comp}$ passing through the compensating bolometers 54. In the first embodiment described above, this current is considered to be identical for each of the compensating bolometers 54, which means that they offer uniform temperature behaviour, or at the very least negligible dispersions relative to the dispersions of the imaging bolometers 14.

In fact, this is not necessarily the case. Like the imaging bolometers 14, the compensating bolometers 54 respond differently when they are subjected to identical environmental conditions, thereby inducing a dispersion in the currents $I_{comp}$ passing through them, and thereby a dispersion in the continuous levels NC(i,j).

Figure 4:
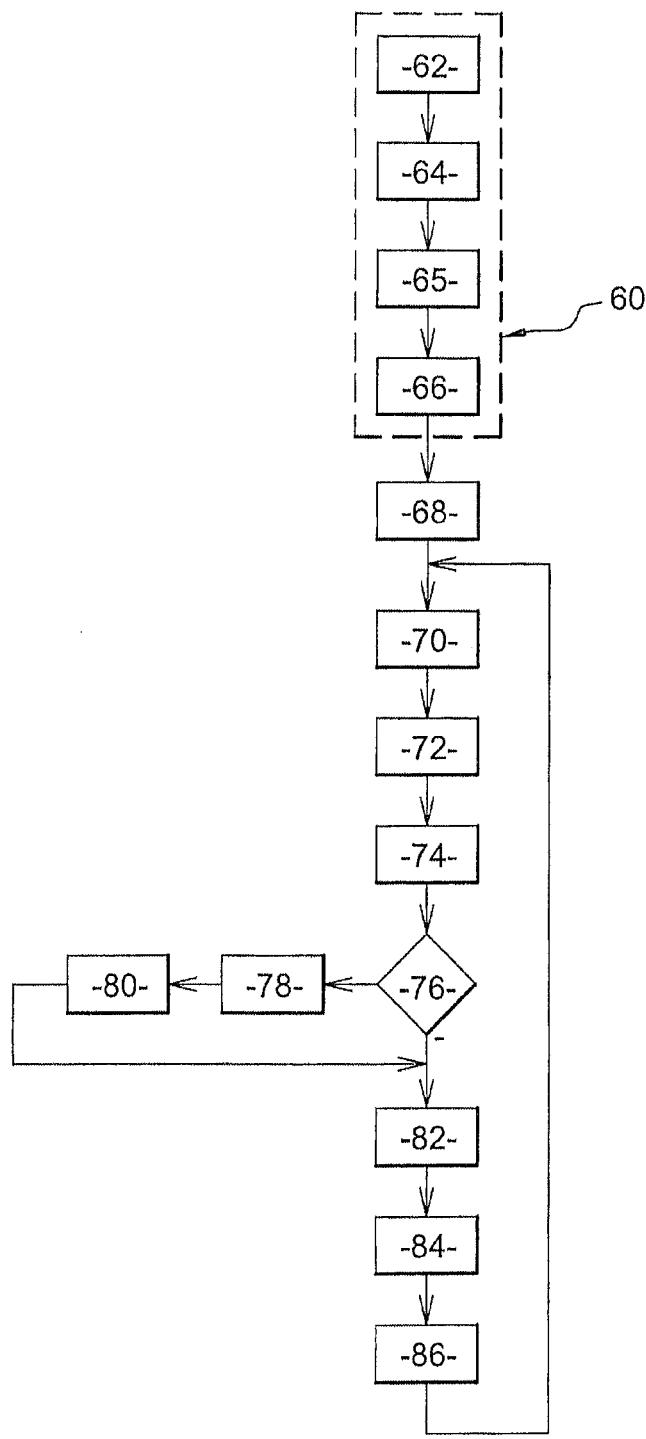
FIG. 4 is a flow chart of the operation of the system in FIG. 1 according to a second embodiment.

A description is now given in relation to FIG. 4 of an embodiment that corrects the offset dispersion in the output signals of the detector which also takes account of the compensating bolometers 54 as the source of the dispersion. The structure of the detector remains unchanged, with only the offset compensation method being modified.

The offset compensation method according to the second embodiment comprises steps 62 and 64 identical to those described previously.

At a following step 65, a second specific read cycle is implemented, wherein the current from the active bolometers is deactivated while leaving the selection switch 50 in the off state, while the gate of the transistor 58 is grounded so that its resistance is rendered negligible.

For a specific compensating bolometer 54, only the current passing through it is therefore integrated by the associated measurement circuit 40. At the end of the read-out of this bolometer, the output voltage $V_{out}$ of the amplifier 44 is therefore expressed according to the relation:

$$V_{out} = VBUS - \frac{\Delta T_{int}}{C_{int}} \times \frac{V_{comp}}{R_{comp}} \quad (10)$$

With substantially:

$$V_{comp} \cong VSK-VBUS \quad (11)$$

It will be noted as previously that to implement the read step 65, the difference between the voltages VSK and VBUS at step 65, and/or the integration time $\Delta T_{int}$ and/or a larger capacitor $C_{int}$, may be selected to avoid saturation of the amplifier 44.

Once the read-out of the array 12 and of the line 20 are complete, a reference resistance $R_{abs}$ is calculated, at a following step 66, for each imaging 14 and compensating bolometer 54 by the data processing unit 26 from a physical model of the temperature behaviour of its resistance.

To be more specific, at 66, the data processing unit 26 calculates the reference resistance according to the relations:

$$R_{abs}(i,j) = R_{ac}(i,j)\cdot \exp\left(-\frac{E_A}{k\cdot T_{ref}}\right) \quad (3)$$

$$R_{comp-abs}(j) = R_{comp}(j)\cdot \exp\left(-\frac{E_A}{k\cdot T_{ref}}\right) \quad (12)$$

$$R_{ac}(i,j) = \frac{VBUS-VDET}{(V_{out}(i,j)-VBUS)} \times \frac{\Delta T_{int}}{C_{int}} \quad (4)$$

$$R_{comp}(j) = \frac{VSK-VBUS}{(VBUS-V_{out}(j))} \times \frac{\Delta T_{int}}{C_{int}} \quad (13)$$

where:

exp is the exponential function, $E_A$ is a predetermined bolometer activation energy, k is the Bolzmann constant, et $T_{ref}$ is the substrate temperature measured at step 60.

Once the initialization step 60 is complete, a two-dimensional table $R_{abs}$ of reference resistances is thus obtained for the imaging bolometers of the array 12 and for compensation of the line 20. This table is then stored in the bulk memory 32 of the data processing unit 26.

Once the detector has left the factory and is operated by the user, the method continues in respect of the real-time correction of the offsets of the imaging array 12.

At system power-up, the reference resistance table is loaded, at 68, into the random-access memory 30 of the data processing unit 26. Still at 68, two two-dimensional tables of dimensions corresponding to those of the imaging array 12, namely a table $R_{est}$ of estimated resistances and a table NC of output levels, are reset to zero and stored in the random-access memory 30.

At a following step 70, the array 12 is exposed to a scene to be observed. Next, or at the same time as step 70, the substrate temperature is measured at step 72 by means of a probe 22 and the temperature value is stored as a parameter $T_{mes}$.

The method then continues with a step 74 for the conventional read-out (with common mode compensation) of the imaging bolometers 14 of the array 12, like has been described previously. The different measured voltages (or output levels) $N_{brut}$ associated with these bolometers are digitized and stored in the random-access memory 30.

A test is then applied at step 76 by the unit 26 to state whether the absolute value of the difference between the values $T_{ref}$ and $T_{mes}$ is greater than a predetermined threshold value, for example equal to 0.2 degree Kelvin.

If the result of this test is positive, an estimated resistance $R_{est}(i,j)$ and $R_{comp-est}(i,j)$ is calculated at 78 for each bolometer of the array 12 and of the compensation line 20 by the unit 26. This estimated resistance of the bolometer is calculated as a function of the corresponding reference resistance $R_{abs}(i,j)$ and $R_{comp-abs}(j)$ of the table $R_{abs}$, according to the relations:

$$R_{est}(i, j) = R_{abs}(i, j) \cdot \exp\left(\frac{E_A}{k \cdot T_{mes}}\right) \quad (5)$$

$$R_{comp-est}(j) = R_{comp-abs}(j) \cdot \exp\left(\frac{E_A}{k \cdot T_{mes}}\right) \quad (14)$$

The value $R_{est}(i,j)$ or $R_{comp-est}(j)$ then replaces the corresponding value of the table $R_{est}$.

Once step 78 is complete, an estimated resistance has therefore been calculated for each bolometer of the imaging array 12 and of the line of compensation circuits 20 and stored in the table $R_{est}$.

The method then continues with a step 80 for the calculation, for each imaging bolometer of the array 12, of an output level when facing the uniform scene NC(i,j) by the unit 26 according to the relations:

$$NC(i, j) = VBUS - \frac{\Delta T_{int}}{C_{int}}(I_{comp}(j) - I_{ac}(i, j)) \quad (15)$$

Those skilled in the art are able to express $I_{comp}$ when the MOS 58 is in saturated mode, from the technological parameters and from the circuit configuration, according to the relation:

$$I_{comp}(j) = \frac{-(1 + 2 \cdot R_{comp-est}(j) \cdot A_p(VSK - GSK - V_{thp})) - \sqrt{1 + 4 \cdot R_{comp-est}(j) \cdot A_p(VSK - GSK - V_{thp})}}{-2 \cdot A_p^2 \cdot R_{comp-est}^2(j)} \quad (16)$$

On the other hand $I_{ac}$ is expressed, when the MOS 52 is in saturated mode, by the relation:

$$I_{ac}(i, j) = \frac{-(1 + 2 \cdot R_{est}(i, j) \cdot A_n(GFID - V_{thn})) - \sqrt{1 + 4 \cdot R_{est}(i, j) \cdot A_n(GFID - V_{thn})}}{-2 \cdot A_n \cdot R_{est}^2(i, j)} \quad (8)$$

where

Ap and An are known technological factors of the MOS 58 and 52 respectively;

$V_{thp}$ and $V_{thn}$ are the known threshold voltages of the MOS 58 and 52 respectively; and VFID and GSK being the voltages applied to the gates of the transistors 52 and 58 respectively, also known.

The newly calculated continuous levels NC(i,j) then replace the values of the table NC corresponding to the imaging bolometers. Once step 80 is complete, a so-called continuous uniform scene level has therefore been calculated for each bolometer of the imaging array 12 and stored in the table NC.

Step 80 is followed by a step 82 for the correction by the unit 26 of the digitized output voltage $N_{brut}(i, j)$ of each imaging bolometer according to the relation:

$$N_{corr}(i,j) = N_{brut}(i,j) - NC(i,j) + \overline{NC} \quad (9)$$

where $N_{corr}(i,j)$ is the corrected digitized output voltage and $\overline{NC}$ is the mean value of the output voltages when facing a uniform scene calculated at step 80.

If the test applied at step 76 is negative, in other words if the substrate temperature has not varied significantly between two read cycles of the imaging array 12, step 76 loops to the correction step 82. The continuous level is then corrected on the basis of a table of continuous levels NC calculated during a previous cycle.

Step 82 then continues with the display, or more generally the use, at 84, of the corrected image of the scene captured by the array 12, and then at step 86 with the adjustment of the value of the temperature $T_{ref}$ to the value $T_{mes}$. Step 86 then loops to the exposure step 70 to fulfil a new read cycle.

As it is possible to note, the detection system according to the invention uses the following concepts.

For continuous level or imaging bolometer offset correction, a physical model thereof according to the relation (5) is used. This model requires only a reference resistance table, and possibly additionally an activation energy table (which is very easy to acquire from the initial recording of the NC tables at two sufficiently different focal plane temperatures, in spatially isothermic conditions), in order to know the behaviour of the imaging array over the entire operating range in focal plane temperatures thereof.

Furthermore, from a physical model of the formation of the signal from the imaging bolometer, it is possible to predict the bolometer offset by simulating an illumination of the imaging array by a uniform scene. Indeed, in the case of such an illumination, commonly implemented by means of a mechanical shutter, the temperatures of each element of the array 12, of the compensation line 20, of the substrate and of the scene are substantially equal.

Thus, at each array read cycle, using a physical model of the signal formed from an imaging bolometer, such as the one in relation (6) detailed by relations (7) and (8), and associated with the bolometer-specific relation (5) (first embodiment), or such as the one in relation (15) detailed by relations (8) and (16), and associated with relations (5) and (14) (second embodiment), allows simulation of output continuous level behaviour consequential upon an illumination by a uniform scene of temperature equal to the measured temperature of the substrate.

The signal formation model can be refined on the basis of relation (5) or relations (5) and (14), which specifically model bolometric resistance behaviour, in order to take account of the well-known self-heating effect related to the bias current of the bolometers 14 during the read-out, or even the residual self-heating of the compensating bolometers 54.

The simulated behaviour is shown in the tables $R_{est}$ and NC. The corresponding signal continuous levels NC(i,j) output from the read circuits 40 if they were facing a uniform scene at the focal plane temperature are given by the relation (6) (first embodiment) or (14) (second embodiment).

The corrected output level when facing any scene $N_{corr}(i,j)$ of a bolometer according to the relation (9) does therefore correspond to an output voltage thereof, wherein an offset $\overline{N_{brut}}-NC(i,j)$ relative to a mean output voltage $\overline{N_{brut}}$ of the array is cancelled.

Clearly other embodiments are possible.

In order to further refine the accuracy of the compensation of the offsets appearing in the output signals of the array 12, it may also be advantageous to model the dispersions occurring in the voltage VBUS delivered to the amplifiers 44, and/or the dispersion of the capacitances $C_{int}$ thereof.

In the embodiments that have just been described, the activation energy $E_A$, provided for example by the manufacturer of the imaging bolometers, is presumed to be identical for all imaging bolometers. This is justified in particular in the situation where the bolometric material used for the imaging bolometers is amorphous silicon. It is observed indeed in this event that dispersion among the activation energies of the bolometers is absolutely negligible and that there is therefore no need to take account thereof.

However, in specific uses that require increased accuracy or in the event of a bolometric material being used that demonstrates not insignificant activation energy dispersion from one bolometer to another one, an activation energy is set up at the initialization step 60 in respect of each imaging bolometer, if not also of each compensating bolometer, since the individual acquisition protocol previously mentioned permits it in the same way. These energies are then stored in the bulk memory 32 in the form of a table of dimensions corresponding to those of the imaging array (plus the compensation line 20) and is used during offset correction.

For example, the activation energy $E_A(i,j)$ of an imaging bolometer is determined at the initialization step 60 by implementing twice the steps 62 and 64 with different focal plane temperatures, but facing a uniform scene of identical temperature.

The data processing unit 26 then calculates the activation energy of the bolometer 14 according to the relations:

$$E_A(i,j) = k \cdot \frac{(T_{ref2} \cdot T_{ref1})}{(T_{ref2} - T_{ref1})} \cdot \ln\left(\frac{R_1(i,j)}{R_2(i,j)}\right) \quad (10)$$

where $T_{ref1}$ and $T_{ref2}$ are the two predetermined focal plane temperatures, and R1(i,j) and R2(i,j) are the measured resistances of the bolometer (i,j) for these two temperatures respectively. The same type of application gives access to the activation energies of the common mode compensating bolometers, if necessary.

A device has been described wherein the temperature is measured by means of a single probe.

As an alternative, a plurality of temperature probes are implanted into the detector substrate, and a temperature table, denoted $T_{mes}(i,j)$ is established, from the signals $T_{mes\_probe}(k)$ provided by the plurality of temperature probes.

Relation (5) is then replaced by the relation:

$$R_{est}(i,j) = R_{abs}(i,j) \cdot \exp\left(\frac{E_A}{k \cdot T_{mes}(i,j)}\right) \quad (5b)$$

It will be noted that unless a temperature probe is installed in proximity to each bolometer, which is a direct possibility in order to obtain the table $T_{mes}(i,j)$, a highly acceptable result is obtained by means of a reduced number of probes, arranged for example on the periphery of the array. The table $T_{mes}(i,j)$ is then established for example by means of a spatial thermal model which approximates the focal plane temperature distribution in the immediate vicinity of each bolometer, as a function of the spatial sampling $T_{mes\_probe}(k)$ provided by the limited plurality of temperature probes.

In such a case, the offset correction of an imaging bolometer takes the focal plane temperature spatial dispersion into account, including in the vicinity of the compensating bolometers, dispersions whereof the effect is eliminated by the digital correction established by means of the table $T_{mes}(i,j)$. Correction accuracy is thus increased.

When taking into account temperatures in the vicinity of the active bolometers and the compensating bolometers, relations (5) and (14) are thus respectively replaced by relations (5A) and (14A):

$$R_{est}(i,j) = R_{abs}(i,j) \cdot \exp\left(\frac{E_A}{k \cdot T_{mes}(i,j)}\right) \quad (5A)$$

$$R_{comp-est}(j) = R_{comp-abs}(j) \cdot \exp\left(\frac{E_A}{k \cdot T_{mes}(j)}\right) \quad (14A)$$

As already said, the resistance of the active bolometers depends essentially on the substrate temperature, by far more than it does from the scene temperature, and the resistance of the compensation bolometers does not depend on the scene temperature. Considering that the temperature coefficient of variation of resistance with temperature (TCR) of the usual semiconducting bolometric materials, like amorphous silicon and vanadium oxides, amounts usually −2% par degree Kelvin around 300 K, a local "hot spot" of +0.5 K would shift the bolometer resistance (active or compensation) built over this spot by −1% relatively to bolometers built some distance away over areas at the baseline substrate temperature.

Such local temperature difference is likely to occur at least for large arrays, stemming for instance from power dissipation in the substrate related to readout structures (like CTIAs 40), output video amplifiers, analog to digital converters (ADCs 24), etc. Specially for large formats detectors, amplifiers and ADCs are particularly power consuming in relation with the necessary high operating frequencies, and usually cannot be distributed over the read circuit area in order to minimize the temperature local offsets.

This relative exemplary difference of 0.5% in bolometer resistance is in the order of magnitude of the natural dispersion of resistance of state-of-the-art uncooled detectors. It results that taking into account the spatial temperature distribution of the substrate makes sense, at least for large format arrays, in the scope of shutterless offset correction.

Figure 1B:
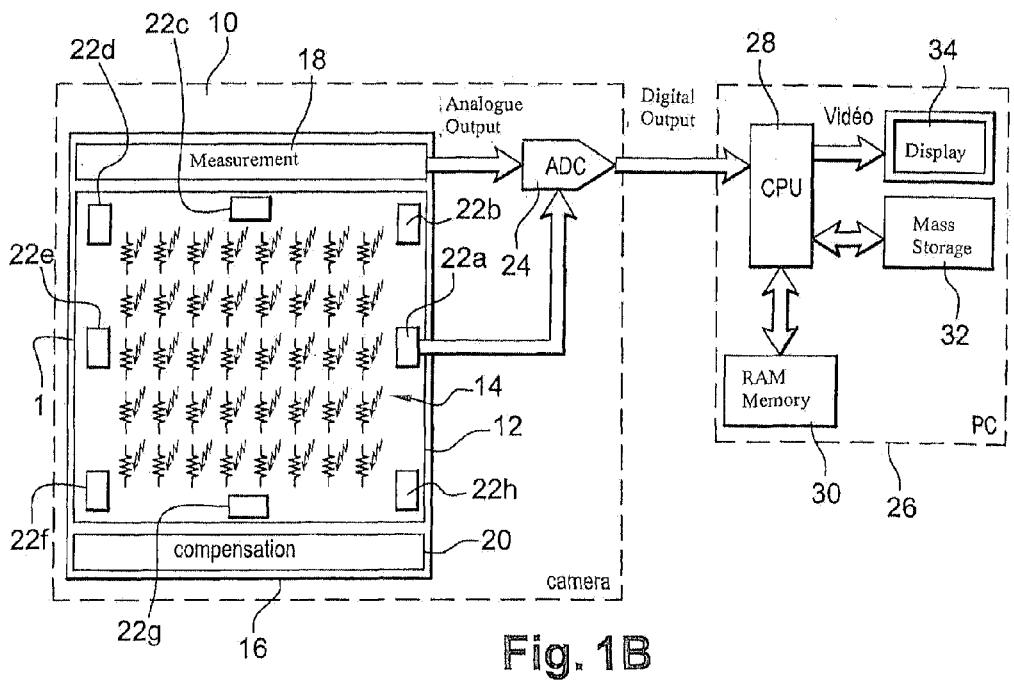
FIG. 1B is a diagrammatic view of a bolometric detection device according to a second embodiment the invention

The implementation of for example four temperature probes disposed near the four corners of a 2 dimensional array, or eight temperature probes $22a$-$22h$ as illustrated in FIG. 1B, gives already the opportunity to substantially correct for the main part of temperature spatial dispersion. The thermal model of temperature distribution referred to previously, may be defined as assigning the average $T_{mes\text{-}avg\text{-}probe}$ of the temperature signals $T_{mes\_probe}(k)$ at the center of the array (at the bolometer closest to this point), and adding to this average value a local complement $\Delta T_{mes}(i,j)$ proportional to the distance from the center in the lines and columns directions, at such rate that extending the calculation of the temperature in the vicinity of each probe location would give essentially each actually measured temperature.

It must be understood that though the notations $T_{mes\_probe}(k)$ or $\Delta T_{mes}$ suggest a "measured" temperature, they are referred to, in the general case of multiple probes, as calculated (modelized) temperatures. Namely, the terms $T_{mes}(i,j)$ corresponding to the active bolometers and the terms $T_{mes}(j)$ corresponding to the compensating bolometers are the approximated values of local temperatures given by the thermal model used at coordinates (i,j) or (j), and corresponding to the current set of actually measured temperatures $T_{mes\_probe}(k)$ given by the plurality of probes.

There is no need to give detailed formulations of $T_{mes}(i,j)$ beyond the exemplifying descriptions given hereabove, since this simple linear modelling would be readily implemented, as well as more refined ones. For example, a second-order interpolation in the line direction may be preferred, based on at least three probes disposed along (for example) the top and bottom sides of the array, completed by a linear interpolation in the column dimension. These examples are to be considered as non-limiting.

The temperature distribution pattern in the general case may anyway not be linear between largely spaced probes. In this case standard representative spatial distributions of temperature, in relation with the probe locations may be extracted from dedicated measurements over similar or development detectors in a plurality of operating conditions, and implemented within some particularly relevant spatial model. This model would thus be deemed to afford a satisfactory approximation of the substrate temperature in the vicinity of each (i,j) and/or (j) location, while using a very limited number of probes, for example four as previously suggested.

If useful, the plurality of probes may even be distributed over the active area of the array, in order to give a "high density" temperature spatial sampling. These probes may be distributed according to a regular square, rectangular or hexagonal network extending typically over the full sensitive area and compensation line 20. The density of this probe network is typically very far lower than that of the bolometer array itself. Typically, the pitch of the probes may be 50 to 100 times larger than the pixel pitch, while still giving a very rich temperature pattern information. There would be no need in this case, even though this remains possible, for interpolating the substrate temperature at bolometer sites between probed locations. Typically, the same probed temperature might be assigned to all bolometers closest to a given probe.

Obviously, for readout structures using a common compensation bolometer by column, multiple temperature sampling is useful for accurate NC modelling, by estimating the temperature in the close vicinity of each compensation bolometer, in order to cancel columnwise NC dispersions (offsets) due to temperature gradients along the line 20. This may be achieved according to the invention by the means of a spatial thermal model inspired for example from the above considerations. The mere disposition of two probes disposed nearby the ends of the line 20, possibly the same ones than used for the sensitive area modelling, might be sufficient for satisfactory spatial correction of the compensating bolometers current.

More probes along the compensating line 20 associated with a linear or higher order interpolation thermal model may too be used for accurately estimating each $R_{comp\text{-}est}(j)$ from the modellized $T_{mes}(j)$ data, and further estimating the $I_{comp}(j)$ and finally the $NC(i,j)$ values.

If a plurality of probes is implemented in the substrate, the temperature test performed at step 76 by the unit 26 to state whether the offsets need to be refreshed is to be defined exactly in the same manner, but considering now a plurality of inputs.

As an example of one of the simplest forms, the absolute values of the differences $\Delta T = T_{mes} - T_{ref}$ corresponding to each probe is calculated, and if at least one of these differences is greater than a predetermined threshold $\Delta T_{max}$, for example equal to 0.2 degree Kelvin, the sequence is resumed to step 78.

According to another more refined form of this test, the table $T_{mes}(i,j)$ including an additional line $T_{ref}(j)$ associated with the compensating bolometers is first calculated by the unit 26, and a table of the absolute values of the differences $\Delta T(i,j) = T_{mes}(i,j) - T_{ref}(i,j)$ including an additional line $\Delta T(j) = T_{mes}(j) - T_{ref}(j)$ is calculated and stored in an additional memory space. A test is then performed in order to state whether the number of elements of the $\Delta T(i,j)$ table that are higher than a predetermined threshold $\Delta T_{max}$, is higher than a predetermined maximum number $N_{max}$ of elements of this table. For example, this threshold equals 1% of the total number $(n+1) \cdot m$ of elements of the $\Delta T(i,j)$ table. If this test is satisfied, the sequence proceeds through step 78 and further, in order to refresh the offsets table. Then at step 86 the table $T_{ref}(i,j)$ including the additional line $T_{ref}(j)$ is replaced by the table $T_{mes}(i,j)$ including the additional line $T_{mes}(j)$.

The temperature tests performed at step 76 may advantageously be separated in a first subtest over the temperatures of the active bolometers $T_{mes}(i,j)$ and a second subtest over the temperatures of the compensating bolometers $T_{ref}(j)$. For example, a first subtest is applied as previously described is applied to the $\Delta T(i,j)$ strictly corresponding to the n·m elements of the active area, with a first threshold $\Delta T_{ac\_max}$ and a first countdown threshlod $N_{ac\_max}$. A second subtest is then applied to the $\Delta T(j)$ corresponding to the m compensating elements corresponding to line 20. For example, this second subtest states whether at least one of these values is greater than a predetermined second threshold $\Delta T_{comp\_max}$. Alternately, the number of values exceeding this second threshold is determined and compared to a second countdown threshold number $N_{comp\_max}$ of values exceeding $\Delta T_{comp\_max}$.

It will be observed in this respect that the imaging bolometers can therefore be considered individually in respect of correcting their offset in so far as the relation (9) remains unchanged for the reasons mentioned previously in respect of the value $\overline{N_{brut}}$.

A detection device has been described wherein the data processing unit 26 and the parameter table or tables used for the physical model of the imaging bolometers are external to the camera which is for example infrared.

As an alternative, the data processing unit 26 is built into an enclosure of the camera. In this alternative, the bulk memory is replaced by a read-only memory for the storage of the parameter tables. The data processing unit 26 is then for example implemented in the form of an electronic board.

In another alternative, the parameter tables are recorded in a read-only or flash memory, directly formed in the substrate wherein the read circuit is defined furthermore.

In another alternative wherein the unit 26 is built into the camera, the conversion circuit 24 and the data processing unit 26 are implemented in the same substrate as the one carrying the read circuit furthermore.

Clearly other physical models than that in relation (5) or relations (5) and (14) can be used depending on the degree of accuracy required and on the processing power of the data processing unit 26, although the one in relation (5) is preferred in respect of its accuracy, its straightforwardness, and its relevance in the specific event of amorphous silicon being used.

Likewise, other physical signal formation modellings, exemplified here by the elements 40 and 42, described through relations (6) and sub-relations of currents (7) and (8) (first embodiment) or through relations (15) and sub-relations (8) and (16) (second embodiment) can be used depending on the specific configuration and details of the signal formation circuitry.

The device that has just been described therefore has the following advantages:
- use of a physical model allows more accurate correction than that achieved from multiple table interpolation. Indeed, an interpolation, which conceals no physical reality, remains less accurate in modelling bolometer behaviour than a physical model thereof, which reflects the reality of phenomena with a high degree of accuracy;
- use of a physical model makes it possible to take accurate account of the scene temperatures outside the range of temperatures of the tables for interpolation, in other words allows extrapolation;
- use of a physical model only requires a limited number of tables, or even requires only one table in the case of the model in the relation (5). Memory savings are thus made, which is advantageous in the event of the tables being stored in read-only or flash memories; and
- offset correction according to the invention requires no mechanical element such as a shutter for example. However, correction according to the invention simulates the use of a shutter which is commonly the most effective means of obtaining a uniform scene and therefore the most accurate means to determine the bolometer offsets;
- the volume of calculations to be processed in order to implement the invention is compatible with real-time implementation thereof on a present-day processor. The advantage of the invention is therefore that it offers an advantageous compromise between correction accuracy and algorithmic implementation compactness.

The invention can be used in the field of image or thermometric sensors with bolometric detection, whatsoever the detection frequency band or the type of bolometric material used to manufacture the imaging and compensating bolometers, such as for example amorphous silicon (a-Si) or similar materials alloyed with carbon or germanium, and doped in various ways, vanadium oxides (VOx), a metal (for example titanium).

The invention claimed is:

1. A device for detecting infrared radiation comprising:
a substrate;
a array of at least one line of elements for detecting said infrared radiation, each of said elements comprising a resistive imaging bolometer, said array being formed above the substrate;
a read circuit for applying electrical stimuli to each imaging bolometer of said array to form an analog electrical signal constituting an image of said infrared radiation impinging on said array;
a plurality of probes for measuring temperatures in a plurality of points of the substrate;
an analog-to-digital converter for converting the analog electrical signals formed by the read circuit and the probe into digital values;
a data processing unit comprising:
   a first memory space for storing digital values NC(i,j) corresponding to electrical signals from the array of imaging bolometers;
   a second memory space for storing a single set of parameters of a predetermined physical model of the electrical signals formed by the read circuit comprising:
      a first subset of parameters of a predetermined physical model of a resistance of the imaging bolometers as a function of the substrate temperature in the vicinity of each bolometer; and
      a second subset of parameters of a predetermined physical model of the electrical signals formed by the read circuit as a function of the resistance of the imaging bolometers;
   a third memory space for storing a set of parameters of a predetermined spatial model of the substrate approximating the temperature of the substrate in the immediate vicinity of each imaging bolometer based on temperatures of the substrate in said plurality of points thereof;
   a central processing unit for:
      correcting the digital electrical signal formed from each imaging bolometer according to the relation:

$$N_{corr}(i,j) = N_{brut}(i,j) - NC(i,j) + \overline{NC}$$

where: $N_{brut}(i,j)$ is the digital electrical signal from said bolometer, $N_{corr}(i,j)$ is the corrected digital electrical signal of said bolometer, and $\overline{NC}$ is the mean value of the digital values NC(i,j) stored in said first memory space;
      computing temperatures $T_{mes}(i,j)$ of the substrate in the vicinity of each imaging bolometer based on measured temperatures $T_{mes\_probe}(k)$ in said plurality of points of the substrate and said set of parameters of said spatial model;
      computing resistances $R_{est}(i,j)$ of the imaging bolometers based on said computed temperatures $T_{mes}(i,j)$ in the vicinity of each imaging bolometers and said first subset of parameters of said physical model of a resistance;
      computing digital values NC(i,j) based on said computed resistances $R_{est}(i,j)$ of the imaging bolometers and said second subset of parameters of said physical model of the electrical signals; and
      overwriting said computed digital values NC(i,j) in said first memory space.

2. The infrared radiation detection device as claimed in claim 1, wherein the central processing unit estimates the resistance of each imaging bolometer according to the relation:

$$R_{est}(i,j) = R_{abs}(i,j) \cdot C(T_{mes}(i,j))$$

where $R_{est}(i,j)$ is the estimated resistance of the imaging bolometer, $R_{abs}(i,j)$ is a predetermined reference resistance of the imaging bolometer stored in the second memory space for storing a single set of parameters, and $C(T_{mes}(i,j))$ is a parameter dependent on the temperature $T_{mes}(i,j)$ of the substrate in the vicinity of the imaging bolometer.

3. The infrared radiation detection device as claimed in claim 2, wherein the parameter $C(T_{mes}(i,j))$ is calculated according to the relation:

$$C(T_{mes}(i,j)) = \exp\left(\frac{E_A}{k \cdot T_{mes}(i,j)}\right)$$

where $E_A$ is a predetermined imaging bolometer activation energy, k is the Bolzmann constant stored in the second memory space for storing a single set of parameters, and $T_{mes}(i,j)$ is the computed temperature of the substrate in the vicinity of the imaging bolometer expressed in degrees Kelvin.

4. The infrared radiation detection device as claimed in claim 2, wherein the reference resistances $R_{abs}$ of the imaging bolometers of the matrix are tabulated in a permanent memory built into the substrate.

5. The infrared radiation detection device as claimed in claim 1,
wherein said device further comprises a common mode compensation structure that includes a compensating bolometer associated with each column of the array of imaging bolometers, the read circuit forming the electrical signal constituting the image of the infrared radiation impinging on said array from a difference between a current flowing in each imaging bolometer and a current flowing in the compensating bolometer associated therewith,
wherein the second subset of parameters of the predetermined physical model of the electrical signals formed by the read circuit comprises:
a first set of parameters of a predetermined physical model of a resistance of said compensating bolometers as a function of the substrate temperature in the vicinity of each compensating bolometer; and
a second set of parameters a predetermined physical model of the electrics signals formed by the read circuit based on the resistance of the compensating bolometers and the resistance of the imaging bolometer,
wherein the central computing unit:
computes the substrates temperature $T_{mes}(j)$ in the vicinity of each compensating bolometer based on measured temperatures $T_{mes\_probe}(k)$ in said plurality of points of the substrate and said set of parameters of said spatial model, and
computes said digital values NC(i,j) by:
computing resistances $R_{est-comp}(j)$ based on said computed temperatures $T_{mes}(j)$ in the vicinity of each compensating bolometers and said first set of said second subset; and
computing said digital values NC(i,j) based on said computed resistances $R_{est}(i,j)$ of the imaging bolometers, said computed resistances $R_{comp-est}(i,j)$ of the compensating bolometers, and said second set of said second subset.

6. The infrared radiation detection device as claimed in claim 5, wherein the central processing unit estimates the resistance of each compensating bolometer according to the relation:

$$R_{comp-est}(j) = R_{comp-abs}(j) \cdot C(T_{mes}(j))$$

where $R_{comp-est}(j)$ is the estimated resistance of the compensating bolometer, $R_{comp-abs}(j)$ is a predetermined reference resistance of the compensating bolometer of the $j^{th}$ column stored in the second memory space for storing a single set of parameters, and $C(T_{mes}(j))$ is a parameter dependent on the computed substrate temperature $T_{mes}(j)$ in the vicinity of the compensating bolometer.

7. The infrared radiation detection device as claimed in claim 6, wherein the parameter $C(T_{mes}(j))$ is calculated according to the relation:

$$C(T_{mes}(j)) = \exp\left(\frac{E_A}{k \cdot T_{mes}(j)}\right)$$

where $E_A$ is a predetermined imaging bolometer activation energy, k is the Bolzmann constant stored in the second memory space for storing a single set of parameters, and $T_{mes}(j)$ is the computed substrate temperature in the vicinity of the compensating bolometer expressed in degrees Kelvin.

8. The infrared radiation detection device as claimed in claim 5, wherein the central processing unit calculates a digital value NC(i,j) of each imaging bolometer according to the relation:

$$NC(i,j) = \alpha - \beta \times (I_{comp}(j) - I_{ac}(i,j))$$

where $\alpha$ and $\beta$ are predetermined parameters dependent on the read circuit stored in the second memory space for storing a single set of parameters, $I_{comp}(j)$ is the current flowing in a $j^{th}$ compensating bolometer associated to the imaging bolometer calculated from the estimated resistance thereof, and $I_{ac}(i,j)$ is the current flowing in the imaging bolometer calculated from the estimated resistance thereof.

9. The infrared radiation detection device as claimed in claim 1, wherein the data processing unit is implemented at least partially in the substrate.

10. The infrared radiation detection device as claimed in claim 1, wherein the second memory space is a permanent memory built into the substrate.

11. The infrared radiation detection device as claimed in claim 1, wherein the central processing unit:
stores in a memory space the computed temperatures $T_{mes}(i,j)$ of the substrate in the vicinity of the imaging bolometers associated to the current values of a digital values NC(i, j);
regularly and/or periodically computes new temperatures $T_{mes}(i,j)$ of the substrate in the vicinity of the imaging bolometers based on measured temperatures $T_{mes\_probe}(k)$ in said plurality of points of the substrate and said set of parameters of said spatial model; and
computes new digital values NC(i,j) if an absolute difference between at least one of the new computed temperature $T_{mes}(i,j)$ of the substrate in the vicinity of the imaging bolometers and the correspondent temperature $T_{mes}$(i,j) stored in said memory space is greater than a predetermined threshold value.

12. The infrared radiation detection device as claimed in claim 1, wherein the central processing unit:
   stores in a memory space the measured temperatures $T_{mes\_probe}$(k) in said plurality of points of the substrate associated to the current values of a digital values NC(i, j);
   regularly and/or periodically measures the temperatures $T_{mes\_probe}$(k) in said plurality of points of the substrate; and
   computes new digital values NC(i,j) if an absolute difference between at least one of the new measured temperature $T_{mes\_probe}$(k) and the correspondent measured temperature $\tilde{T}_{mes\_probe}$(k) stored in said memory space is greater than a predetermined threshold value.

13. A method for detecting infrared radiation by means of an array of at least one line of elements for detecting said radiation, each of said elements comprising a resistive imaging bolometer, the array being formed above a substrate, said method comprising:
   applying electrical stimuli to each imaging bolometer of the array to form an analog electrical signal constituting the image of the infrared radiation impinging on said array;
   measuring temperatures $T_{mes\_probe}$(k) in a plurality of points of the substrate;
   converting the analog electrical signals formed by a read circuit and temperature probes into digital values;
   computing the temperatures $T_{mes}$(i,j) of the substrate in the vicinity of each imaging bolometer based on measured temperatures $T_{mes\_probe}$(k) in said plurality of points of the substrate and a set of parameters of a predetermined spatial model approximating the focal plane temperature distribution of the substrate in the immediate vicinity of each imaging bolometer based on temperatures of the substrate in said plurality of points thereof;
   computing resistances $R_{est}$(i,j) of the imaging bolometers based on said computed temperatures $T_{mes}$(i,j) and a set of parameters of a predetermined physical model of a resistance of the imaging bolometers as a function of the substrate temperature in the vicinity of each bolometer;
   computing the digital values NC(i,j) based on said computed resistances $R_{est}$(i,j) of the imaging bolometers and a set of parameters of a predetermined physical model of the electrical signals formed by the read circuit as a function of the resistance of the imaging bolometers; and
   correcting the digital electrical signal formed from each imaging bolometer according to the relation:

$$N_{corr}(i,j) = N_{brut}(i,j) - NC(i,j) + \overline{NC}$$

where: $N_{brut}$(i,j) is the digital electrical signal from said bolometer, $N_{corr}$(i,j) is the corrected digital electrical signal of said bolometer, and $\overline{NC}$ is the mean value of the digital values NC(i,j).

14. The method for detecting infrared radiation as claimed in claim 13, wherein said predetermined physical model of the resistance of the imaging bolometer is a model according to the relation:

$$R_{est}(i,j) = R_{abs}(i,j) \cdot C(T_{mes}(i,j))$$

where: $R_{est}$(i,j) is the estimated resistance of the imaging bolometer, $R_{abs}$(i,j) is a predetermined reference resistance of the imaging bolometer, and and $C(T_{mes}(i, j))$ is a parameter dependent on the temperature $T_{mes}$(i, j) of the substrate in the vicinity of the imaging bolometer.

15. The method for detecting infrared radiation as claimed in claim 14, wherein the parameter $C(T_{mes}(i, j))$ is calculated according to the relation:

$$C(T_{mes}(i, j)) = \exp\left(\frac{E_A}{k \cdot T_{mes}(i, j)}\right)$$

where: $E_A/k$ is a predetermined imaging bolometer activation energy divided by the Bolzmann constant, and $T_{mes}$(i, j) is the temperature of the substrate in the vicinity of the imaging bolometer expressed in degrees Kelvin.

16. The method for detecting infrared radiation as claimed in claim 13,
   wherein said method further comprises compensating a common mode by means of a compensating bolometer associated with each column of the array of imaging bolometers;
   wherein the generation of the electrical signal constituting the image of the infrared radiation impinging said array is based on a difference between a current flowing in each said bolometer and a current flowing in the compensating bolometer associated therewith;
   wherein said predetermined physical model of the electrical signals formed by the read circuit comprises:
      a predetermined physical model of a resistance of said compensating bolometers as a function of the substrate temperature in the vicinity of each compensating bolometer; and
      predetermined physical model of the electrics signals formed by the read circuit based on the resistance of the compensating bolometers and the resistance of the imaging bolometers;
   and wherein the computation of the digital values NC(i,j) comprises:
      computing resistances $R_{est\text{-}comp}$(j) based on said computed temperatures $T_{mes}$(j) in the vicinity of each compensating bolometers and said first set of said second subset; and
      computing said digital values NC(i,j) based on said computed resistances $R_{est}$(i,j) of the imaging bolometers, said computed resistances $R_{comp\text{-}est}$(i,j) of the compensating bolometers, and said second set of said second subset.

17. The method for detecting infrared radiation as claimed in claim 16, wherein said predetermined physical model of the resistance of the compensating bolometer is a model according to the relation:

$$R_{comp\text{-}est}(j) = R_{comp\text{-}abs}(j) \cdot C(T_{mes}(j))$$

where: $R_{comp\text{-}est}$(j) is the estimated resistance of the compensating bolometer of the $j^{th}$ column, $R_{comp\text{-}abs}$(j) is a predetermined reference resistance of the compensating bolometer, and $C(T_{mes}$(j)) is a parameter dependent on the computed substrate temperature $T_{mes}$(j) in the vicinity of the compensating bolometer.

18. The method for detecting infrared radiation as claimed in claim 17, wherein a parameter $C(T_{mes}$(j)) is calculated according to the relation:

$$C(T_{mes}(j)) = \exp\left(\frac{E_A}{k \cdot T_{mes}(j)}\right)$$

where: $E_A/k$ is a predetermined imaging bolometer activation energy divided by the Bolzmann constant, and $T_{mes}(j)$ expressed in degrees of Kelvin.

19. The method for detecting infrared radiation as claimed in claim 16, wherein the digital value NC(i,j) of each imaging bolometer is calculated according to the relation:

$$NC(i,j) = \alpha - \beta \times (I_{comp}(j) - I_{ac}(i,j))$$

where: $\alpha$ and $\beta$ are predetermined parameters dependent on the read circuit, $I_{comp}(j)$ is the current flowing in a $j^{th}$ compensating bolometer associated to the imaging bolometer calculated from estimated resistance thereof, and $I_{ac}(i,j)$ is the current flowing in the imaging bolometer calculated from the estimated resistance thereof.

20. The method for detecting infrared radiation as claimed in claim 13, further comprising:
  storing in a memory space the computed temperatures $T_{mes}(i,j)$ of the substrate in the vicinity of the imaging bolometers associated to the current values of a digital values NC(i,j);
  regularly and/or periodically computing new temperatures $T_{mes}(i,j)$ of the substrate in the vicinity of the imaging bolometers based on measured temperatures $T_{mes\_probe}(k)$ in said plurality of points of the substrate and said set of parameters of said spatial model; and
  computing new digital values NC(i, j) if an absolute difference between at least one of the new computed temperature $T_{mes}(i,j)$ of the substrate in the vicinity of the imaging bolometers and the correspondent temperature $T_{mes}(i,j)$ stored in said memory space is greater than a predetermined threshold value.

21. The method for detecting infrared radiation as claimed in claim 13, further comprising:
  storing in a memory space the measured temperatures $T_{mes\_probe}(k)$ in said plurality of points of the substrate associated to the current values of a digital values NC(i, j);
  regularly and/or periodically measures the temperatures $T_{mes\_probe}(k)$ in said plurality of points of the substrate; and
  computing new digital values NC(i, j) if an absolute difference between at least one of the new measured temperature $T_{mes\_probe}(k)$ and the correspondent measured temperature $T_{mes\_probe}(k)$ stored in said memory space is greater than a predetermined threshold value.

\* \* \* \* \*